(12) United States Patent
Collins (10) Patent No.: US 8,621,153 B2
(45) Date of Patent: Dec. 31, 2013

(54) MICROCODE REFACTORING AND CACHING

(75) Inventor: Jamison D. Collins, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 12/978,583

(22) Filed: Dec. 26, 2010

(65) Prior Publication Data

US 2011/0161575 A1 Jun. 30, 2011

Related U.S. Application Data

(60) Provisional application No. 61/290,201, filed on Dec. 26, 2009.

(51) Int. Cl.
*G06F 12/00* (2006.01)

(52) U.S. Cl.
USPC .................................. 711/125; 711/102

(58) Field of Classification Search
None
See application file for complete search history.

(56) References Cited

U.S. PATENT DOCUMENTS

| | | | |
|---|---|---|---|
| 5,499,355 A * | 3/1996 | Krishnamohan et al. | 711/137 |
| 6,957,319 B1 * | 10/2005 | McMinn et al. | 712/205 |
| 6,968,430 B1 * | 11/2005 | Kashyap | 711/137 |
| 2006/0020758 A1 * | 1/2006 | Wheeler et al. | 711/137 |
| 2008/0055323 A1 * | 3/2008 | Franaszek et al. | 345/530 |

* cited by examiner

*Primary Examiner* — Shawn X Gu
(74) *Attorney, Agent, or Firm* — Trop, Pruner & Hu, P.C.

(57) ABSTRACT

Methods and apparatus relating to microcode refactoring and/or caching are described. In some embodiments, an off-chip structure that stores microcode is shared by multiple processor cores. Other embodiments are also described and claimed.

20 Claims, 6 Drawing Sheets

MICROCODE REFACTORING AND CACHING

RELATED APPLICATION

The present application relates to and claims priority from U.S. Provisional Patent Application No. 61/290,201, filed on Dec. 26, 2009, entitled "MICROCODE REFACTORING AND CACHING" which is hereby incorporated herein by reference in its entirety and for all purposes.

FIELD

The present disclosure generally relates to the field of electronics. More particularly, some embodiments of the invention relate to microcode refactoring and/or caching.

BACKGROUND

Generally, microcode refers to code that provides an interface between hardware components of a processor and higher level machine code. For example, microcode may translate machine instructions into sequences of detailed circuit-level operations. Microcode may be generally stored in a Read-Only Memory (ROM).

Moreover, the cost of implementing the full set of legacy features can be large and continues to grow. A large portion of this cost may result from the area dedicated to the microcode ROM.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation. Also, the use of "instruction" or "micro-operation" or "micro-op" (which may also be referred to as "uop") herein may be interchangeable.

Some embodiments relate to microarchitectural changes to reduce the aggregate area that is dedicated to storing microcode in a multi-core processor. In an embodiment, some or all of the microcode (e.g., stored in a Read-Only Memory (ROM)) of a processor core may be removed, and instead stored off-core (or off the same integrated circuit die as a processor or its core(s)) in a microcode memory such as an SRAM (Static Random Access Memory) or another type of storage device. As a result, microcode fetches from each processor core may then be directed to the external structure (which may be shared amongst a plurality of processors or processor cores, in some embodiments), and the requested micro-ops may be brought back into the processor core for execution. These micro-ops may optionally be buffered on the same integrated circuit chip as the processor or processor core (e.g., in a cache or other storage device) to allow for more efficient future accesses.

In some designs, each processor core may include its own private copy of the complete microcode ROM. While this solution may ensure that all processor cores may execute any micro-op, it also increases the overall area dedicated to the microcode ROM as the number of cores increases.

Also, different microcode flows may not all be accessed with equal frequency. For example, the reset microcode sequence is only exercised during processor reset and when switching back to Real Mode from Protected Mode. Some processor features, such as LT (La Grande technology for computer security) and VT (Virtualization), require significant microcode area, but these microcode flows might not ever be executed during the entire lifetime of a CPU. In contrast, other microcode flows may be frequently executed, and therefore, may require a low latency to access (e.g., repeat string operations).

Figure 1:
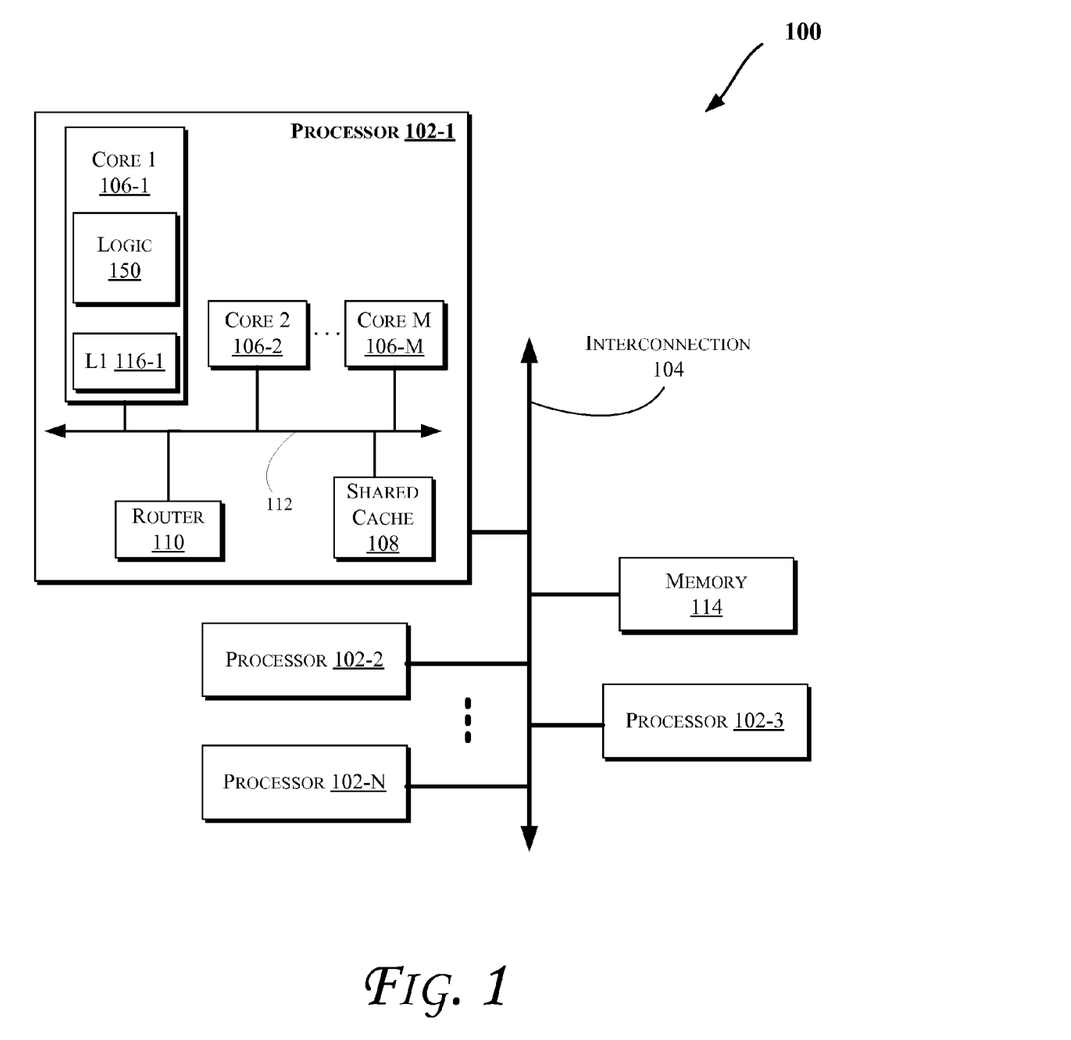
FIGS. 1 and 3-4 illustrate block diagrams of embodiments of computing systems, which may be utilized to implement various embodiments discussed herein.

Techniques described herein may allow for improved performance in various computing devices, such as those discussed for example with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 3 and 4), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a Mid-Level Cache (MLC) (such as a Level 2 (L2), a Level 3 (L3), a Level 4 (L4), or other levels of cache), a Last Level Cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a Level 1 (L1) cache (116-1) (generally referred to herein as "L1 cache 116") and/or an L2 cache (not shown).

Also, processor 102-1 may include a logic 150 to perform operations related to microcode refracting and/or caching, as will be further discussed herein below. Although logic 150 is shown to be inside core 106-1, logic 150 may be provided elsewhere in the system in various embodiments. Also, in some embodiments, logic 150 (or any of its components discussed herein) may be shared amongst a plurality of processor cores.

Figure 2:
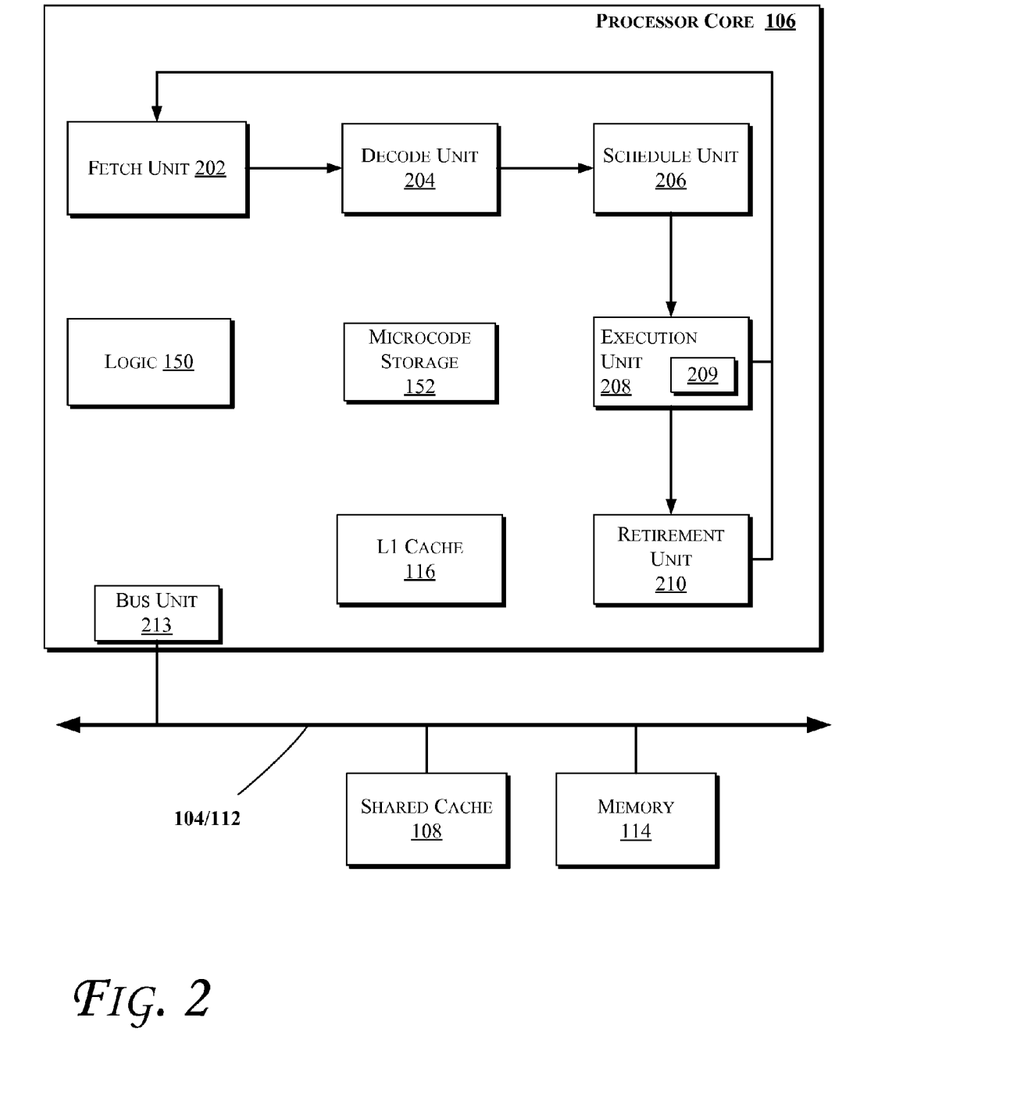
FIG. 2 illustrates a block diagram of portions of a processor core and other components of a computing system, according to an embodiment of the invention.

FIG. 2 illustrates a block diagram of portions of a processor core and other components of a computing system, according to an embodiment of the invention. In an embodiment, at least some of processors discussed herein (e.g., with reference to FIG. 1, 3, or 4) may include one or more of the component of the processor core 106 shown in FIG. 2. Also, a processor may include a single or multi-core 106, which may be homogeneous/symmetric or heterogeneous/asymmetric, etc. such as discussed herein, e.g., with reference to FIG. 1, 3, or 4. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIG. 3 or 4. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available.

In one embodiment, the schedule unit 206 may schedule and/or issue (or dispatch) decoded instructions to an execution unit 208 for execution. The execution unit 208 may execute the dispatched instructions after they are dispatched (e.g., by the schedule unit 206) and, if applicable, decoded (e.g., by the decode unit 204). In an embodiment, the execution unit 208 may include more than one execution unit, such as one or more memory execution units, one or more integer execution units, one or more floating-point execution units (209), or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may further include the logic 150 (such as the logic 150 discussed with respect to any of the figures) to manage access to optional on-chip microcode storage device 152, further discussed herein. Additionally, the core 106 may include a bus unit 213 to allow communication between components of the processor core 106 and other components (such as the components discussed with reference to FIG. 1, 3, or 4) via one or more buses (e.g., buses 104 and/or 112).

Figure 3:
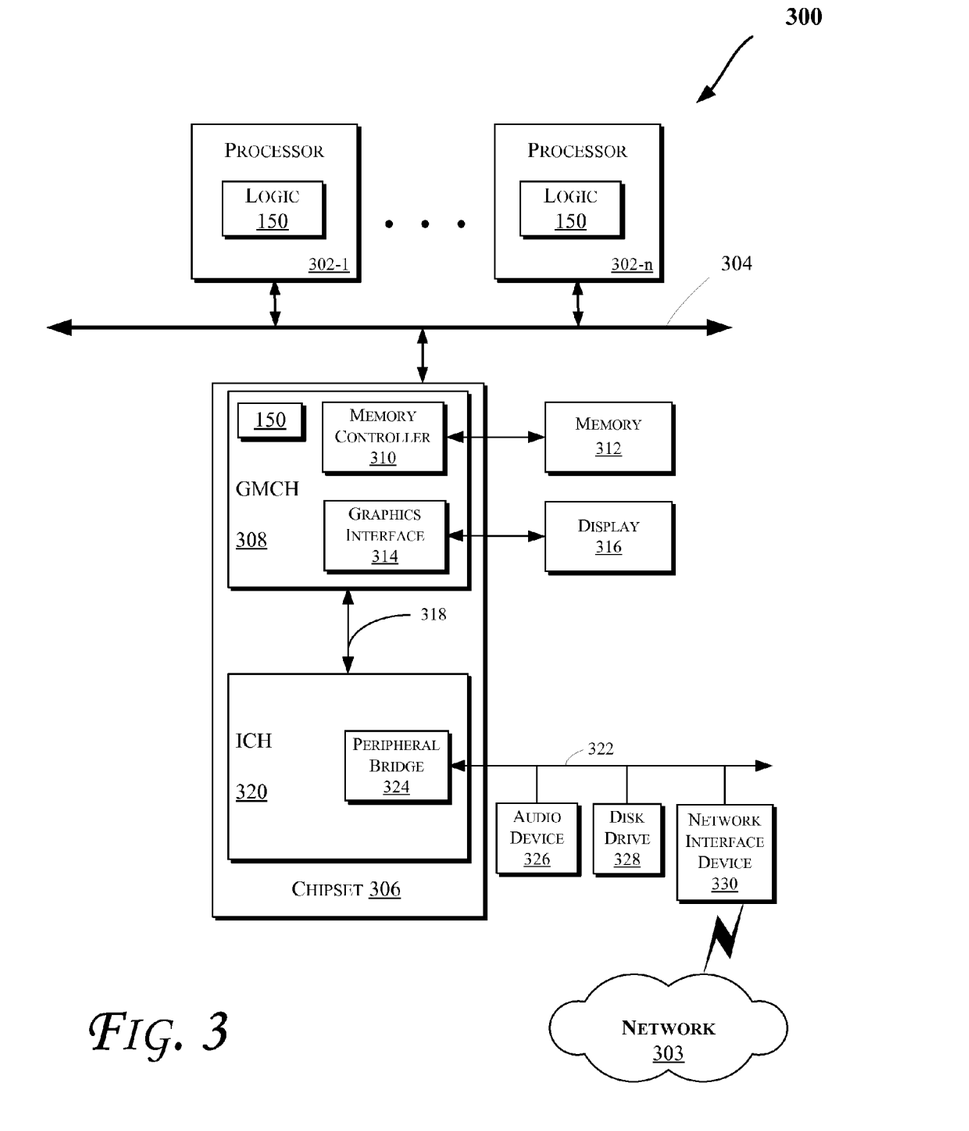

FIG. 3 illustrates a block diagram of a computing system 300 in accordance with an embodiment of the invention. The computing system 300 may include one or more central processing unit(s) (CPUs) 302 or processors that communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors. In an embodiment, one or more of the processors 302 may be the same or similar to the processors 102 of FIG. 1. For example, one or more of the processors 302 may include one or more of the caches, storage devices, and/or components of other figures, including for example, logic 150. Also, the operations discussed herein may be performed by one or more components of the system 300.

A chipset 306 may also communicate with the interconnection network 304. The chipset 306 may include a graphics and memory control hub (GMCH) 308. The GMCH 308 may include a memory controller 310 that communicates with a memory 312 (which may be the same or similar to the memory 114 of FIG. 1). The memory 312 may store data, including sequences of instructions, that may be executed by the CPU 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The GMCH 308 may also include a graphics interface 314 that communicates with a display device 316. In one embodiment of the invention, the graphics interface 314 may communicate with the display device 316 via an accelerated graphics port (AGP). In an embodiment of the invention, the display 316 (such as a flat panel display) may communicate with the graphics interface 314 through, for example, a signal converter that translates a digital representation of an image stored in a storage device such as video memory or system memory into display signals that are interpreted and displayed by the display 316. The display signals produced by the display device may pass through various control devices before being interpreted by and subsequently displayed on the display 316.

A hub interface 318 may allow the GMCH 308 and an input/output control hub (ICH) 320 to communicate. The ICH 320 may provide an interface to I/O device(s) that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330 (which is in communication with the computer network 303). Other devices may communicate via the bus 322. Also, various components (such as the network interface device 330) may communicate with the GMCH 308 in some embodiments of the invention. In addition, the processor 302 and other components shown in FIG. 3 (including but not limited to the GMCH 308, one or more components of the GMCH 308, etc.) may be combined to form a single chip. Furthermore, a graphics accelerator may be included within the GMCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
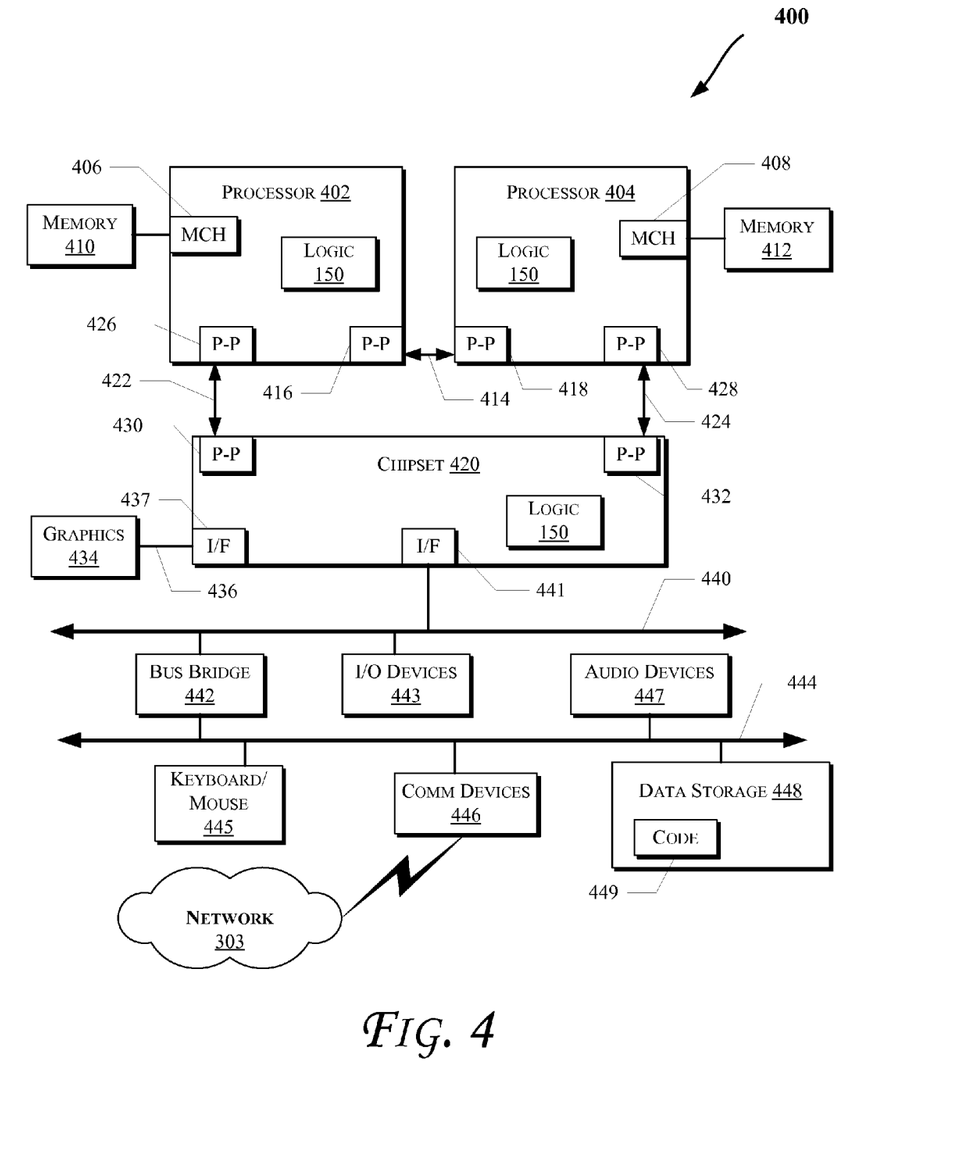

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed herein may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 312 of FIG. 3.

In an embodiment, the processors 402 and 404 may be one of the processors 302 discussed with reference to FIG. 3, e.g., including one or more of the caches discussed herein. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a graphics circuit 434 via a graphics interface 436, e.g., using a PtP interface circuit 437.

At least one embodiment of the invention may be provided within the processors 402 and 404. For example, one or more of the cores 106 of FIG. 1 may be located within the processors 402 and 404. Also, processors 402 and 404 may include one or more of the caches, storage devices, and/or components discussed herein, e.g., logic 150. Other embodiments of the invention, however, may exist in other circuits, logic units, or devices within the system 400 of FIG. 4. Furthermore, other embodiments of the invention may be distributed throughout several circuits, logic units, or devices illustrated in FIG. 4.

The chipset 420 may communicate with a bus 440 using a PtP interface circuit 441. The bus 440 may communicate with one or more devices, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303), audio I/O device 447, and/or a data storage device 448. The data storage device 448 may store code 449 that may be executed by the processors 402 and/or 404.

In some embodiments, a high performance processor (including for example a feature complete x86 processor in an embodiment) is provided by having frequently executed micro-ops remain available to the processor through low-latency on-chip storage (such as the microcode storage 152, a cache or other types of a memory device such as those discussed with reference to FIGS. 1-6), and having the remainder of the microcode ROM being stored off-chip and accessed with relatively longer latency (e.g., but only accessed in rare cases). To this end, some embodiments may cache the more frequently used portion(s) of microcode (e.g., as determined based on one or more expected and/or past accesses, as will also be further discussed below) closer to the core(s) where it would be used. The remaining microcode may be stored in a different storage device such as an SRAM (which may be on or off the same integrated circuit chip as the processor and its core(s)).

Also, on-chip microcode buffers may be designed for lower latency and lower power consumption than could be achieved in accessing the complete microcode ROM. Similarly, as the off-chip microcode SRAM will be accessed less frequently than an on-chip microcode ROM would be accessed, further optimizations of this structure, such as compression (of some or all of the microcode stored in this external memory), are possible.

Figure 5:
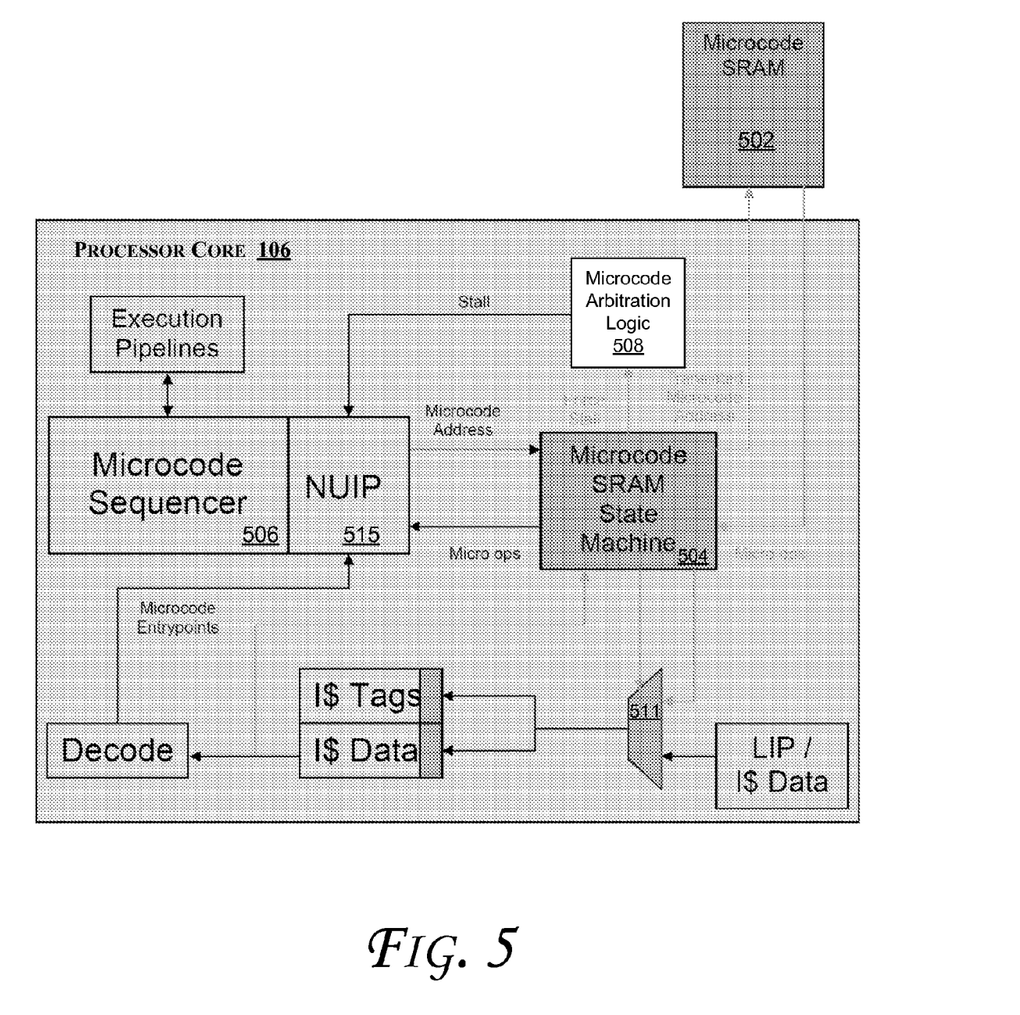
FIG. 5 shows a block diagram of a microcode memory according to some embodiments.

FIG. 5 shows a block diagram of a microcode memory according to some embodiments. More specifically, FIG. 5 shows how the front-end and other processor structures may be enhanced to implement an embodiment.

As shown in FIG. 5, in an embodiment, the Microcode ROM is replaced with a Microcode SRAM 502 outside the processor core 106 (e.g., where the memory 502 may be on the same IC chip or off the same IC chip as the processor core(s) 106). A state machine 504 may be added to the front-end of the processor core 106 to manage communication between a Microcode Sequencer 506 and the introduced or modified components. As shown, the microcode sequencer 506 may communicate with the execution pipeline (e.g., execution unit 208 of FIG. 2). Signals are added to a microcode arbitration logic 508 (e.g., which may be a threaded microcode arbitration logic in an embodiment) as shown in FIG. 5. In one instance, some threaded processors may be capable of forcing a stall in the Microcode Sequencer 506 of one thread while another thread fetches. In an embodiment, this capability may be enhanced to allow the microcode sequencer to force a stall during the variable, and possibly long, latency accesses to the off-core Microcode SRAM. A Multiplexor 510 allows the state machine 504 to read and write instruction cache data, allowing accessed micro-ops to be stored and retrieved from the instruction cache. Uops stored in an off-chip structure may be referenced (and retrieved from the off-chip structure) by reading from a specified special physical address range. This address range may be either fixed or dynamic. In an embodiment, when presented the corresponding virtual or physical address, the existing address decoding mechanisms within the processor core (e.g., TLBs) should yield the corresponding physical address, allowing the cached uops to be correctly retrieved.

Figure 6:
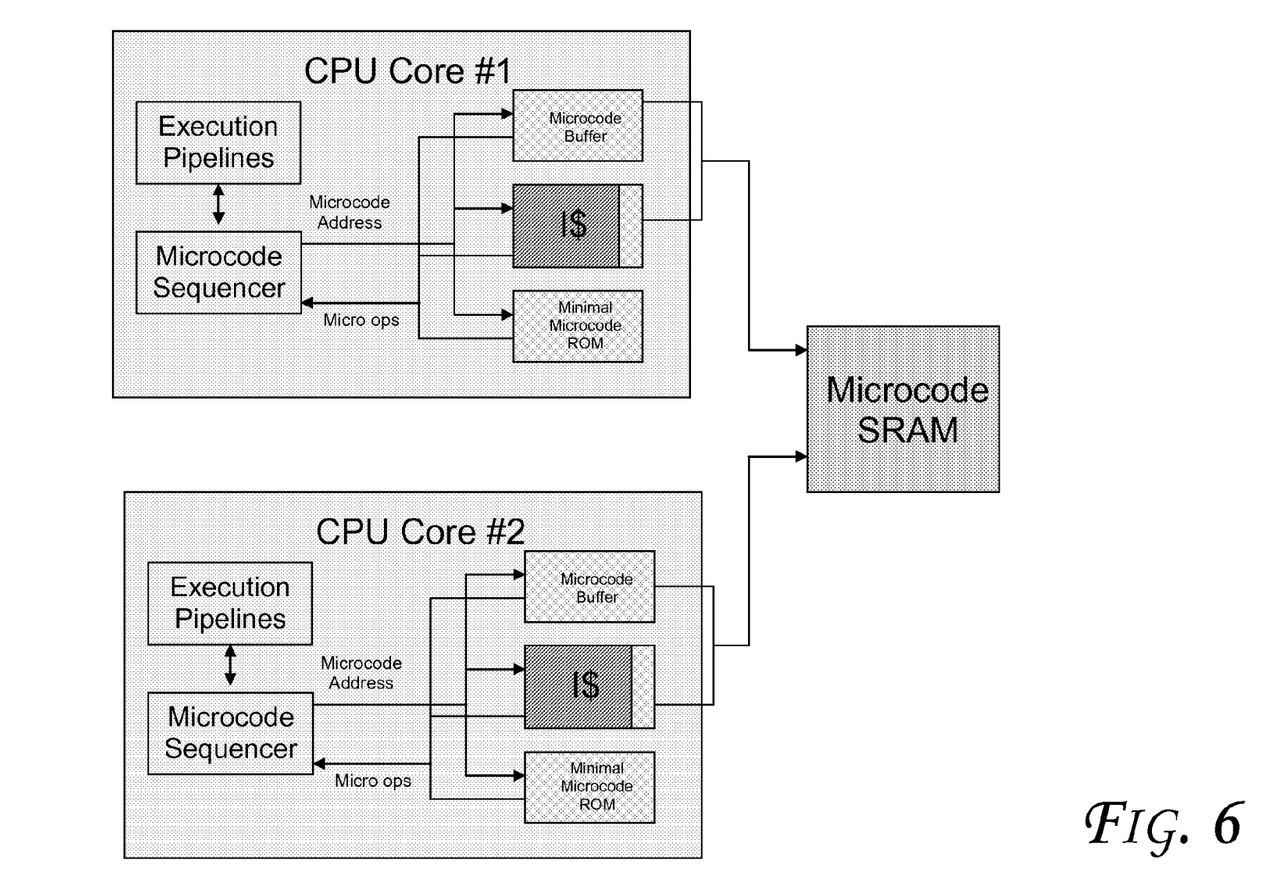
FIG. 6 illustrates a block diagram of a dual core processor, according to an embodiment.

FIG. 6 illustrates a block diagram of a dual core processor, according to an embodiment. Under this implementation, a portion or the complete microcode ROM has been factored out of each processor core and stored in an external microcode SRAM memory (e.g., external to the processor cores where the microcode memory may be on the same IC chip or on a different IC chip).

In one or more embodiments, translating macro-ops (e.g., prior to decoding as discussed with reference to the decode unit 204 of FIG. 2) to micro-ops may be done based on one or more of the following:

1) If the macro-op is a basic macro-op, which may be directly translated to micro-ops by the instruction decoders (e.g., decode unit 204 of FIG. 2), then directly translate the macro-op without requiring microcode ROM access 2) If the macro-op requires microcode access, first try to retrieve the microcode in those structures which might contain a copy as follows:
 a. The minimal microcode ROM (if present)
 b. A separate, on-chip microcode buffer (if present)
 c. The instruction cache (if used to buffer microcode flows)

3) If the requested micro-op is found, provide it to the microcode sequencer for execution 4) If the requested micro-op is not found, generate a request to the external, off-core microcode SRAM to retrieve the requested micro-op 5) Provide this requested micro-op as follows:
 a. To the on-chip microcode buffer (if present) for buffering it is determined it will be required again in the near future
 b. To the I$ (Instruction cache) for buffering if it is determined the micro-op will be needed again in the near future (if I$ is used for this purpose)
 c. To the microcode sequencer so it may be passed on to the execution pipelines In some embodiments, there are three on-chip sources which may be used for a particular micro-op request (e.g., each with different characteristics):

(1) An optional minimal micro-code ROM holds a subset of the full microcode. This would be used either for flows which may be present on-chip, such as the reset micro-code sequence, or those which are expected to be executed frequently, and therefore, should provide highest performance, such as repeat-string micro-code flows. Note that this optional microcode ROM may be significantly smaller than the complete microcode ROM present in some current implementations, and therefore, feature with lower access time and lower power to access.

(2) An optional on-chip microcode buffer may store recently fetched microcode flows. It is on-chip and small, and therefore, may be accessed more quickly than the off-chip microcode SRAM but would not impose any additional instruction cache pressure to store recently accessed microcode flows, avoiding or at least reducing additional instruction cache contention and possibly allowing for a superior physical organization better suited for buffering micro-ops.

(3) Optionally, the instruction cache may hold recently accessed microcode flows. This approach provides a significant area reduction, as it may avoid adding a new on-chip structure for buffering micro-ops. Additionally, it would provide plentiful storage.

While buffering recently fetched micro-ops in any on-chip structure is optional, it may provide significant performance benefits by reducing the longer latency accesses to the off-chip microcode SRAM as well as reducing contention for access to the microcode SRAM. Any combination of these three micro-op buffers is possible in some embodiments.

Access to the off-chip SRAM may be carried out either via a dedicated access channel that is added to each processor core, or could reuse existing mechanisms for shared communication among processor cores. One possibility is to map the microcode ROM to an unused region of physical memory (e.g., memory 412 of FIG. 4). In this case, access to the microcode SRAM is achieved using the existing memory access bus. When a memory request is observed being sent from a processor core, if it is accessing this special memory range, it is instead redirected to the microcode SRAM, which retrieves the requested micro-ops and returns them as the data payload back to the core. Also, a new memory transaction type that may only be generated by the microcode sequencer may be implemented. Alternate approaches, such as sending the microcode across other internal busses, may also be used.

In some embodiments, further optimization may be provided, both to mitigate the performance impact as well as to enable new optimizations that are not feasible in some current implementations. The techniques used for determining which micro-ops should be buffered in the instruction cache may be adaptive. For example, as contention at the microcode SRAM increases, micro-ops may be allowed to occupy a greater amount of instruction cache storage. Alternatively, for programs which incur a large number of instruction cache misses, the priority of buffering microcode flows may be reduced to minimize instruction cache conflicts. Alternatively, non-interference could be enforced by statically partitioning the instruction cache between microcode and instructions.

An embodiment may make it possible to perform optimizations on the microcode stored in the off-chip microcode memory that might have been difficult to implement when the microcode ROM was stored on-chip. For example, micro-ops in this structure may be (aggressively) compressed, and decompressed when accessed by the processor core. If this decompression would require significant latency or power to carry out, it might not have been feasible to implement this mechanism as part of the normal microcode ROM access.

Prefetching may also be applied to either reduce the perceived latency of accessing the microcode SRAM or reducing pressure on the on-chip micro-op storage. Current microcode ROM implementations may contain a separate NUIP (Next Micro Instruction Pointer) ROM 515 (as shown in FIG. 5), which indicates the next microcode address to fetch given the current micro instruction pointer. This structure, or other prediction algorithm, may be used to predict subsequent micro-ops which should be requested from the microcode SRAM. In conjunction with this, only a subset of a particular microcode flow may need be stored on-chip if, upon access to the first few micro-ops in this sequence, the remainder may be brought in from the off-chip SRAM in a timely manner.

An embodiment solves some current problems by factoring out most or all of the microcode ROM from multiple cores, and storing only a single copy off-chip, allowing each core to retrieve those microcode flows that it requires from this shared resource.

Also, one embodiment may be used to improve the performance, area, and/or power requirements of single-core and multi-core CPUs. For multi-core CPUs, one primary benefit may be from requiring only one copy of the microcode ROM (stored in the off-chip microcode SRAM) for multiple cores, permitting each constituent core to dedicate less area to microcode ROM storage.

Additionally, individual processor cores may benefit from some embodiments. For example, the on-chip microcode storage may be smaller, and hence, faster and/or lower power consuming. Also, micro-ops stored in the SRAM, as they are accessed less frequently, may be more aggressively optimized. For example, they may be aggressively compressed as the additional time required to decompress them (on an access to the microcode SRAM) may be amortized over future hits in the on-chip micro-op storage. Further, the on-chip micro-code patch SRAM, used to correct microcode bugs or implement new features, may be eliminated as microcode patches or new features may be stored directly in the microcode SRAM.

Moreover, some modern general purpose microprocessors implement complex operations that cannot be efficiently carried out directly within the processor pipeline (e.g., privilege level transitions, fault/exception handling). Such instructions may be implemented as multiple micro-ops fetched from a microcode ROM or through a similar mechanism. Accordingly, some embodiments may provide efficiency, lower latency, and/or lower power consumption to most microprocessors. Additionally, virtualization and security (e.g., DRM (Digital Rights Management)) may necessitate complex instruction set extensions to general purpose processors, which may likely be implemented through some form of microcode ROM or similar mechanism and could benefit from embodiments discussed herein. Accordingly, some embodiments may provide efficiency, lower latency, and/or lower power consumption to most microprocessors.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a first storage device to store a subset of microcode, the subset corresponding to a portion of the microcode, wherein the subset remains stored in the first storage device and accessible to execution logic during execution of a plurality of instructions;
wherein a second storage device, on a different integrated circuit chip than the processor, is to store a complementary subset of the microcode that is complementary to the subset; and
a first logic to determine whether a first micro-operation of the microcode is to be stored in the first storage device based at least in part on an expected frequency of access to the first micro-operation.

2. The processor of claim 1, wherein the first logic is to determine the subset of the microcode to be stored in the first storage device based on one or more past accesses to the microcode.

3. The processor of claim 1, further comprising a second logic to force a stall during a variable or long latency access to the second storage device.

4. The processor of claim 1, wherein at least one processor core of the processor, the first storage device, and the first logic are on a same integrated circuit chip.

5. The processor of claim 1, wherein the processor further comprises a plurality of processor cores, wherein the second storage device is accessible to each of the processor cores.

6. The processor of claim 1, wherein the subset of the microcode includes a reset microcode sequence.

7. The processor of claim 1, wherein at least a portion of the microcode stored in the second storage device is compressed.

8. A method comprising:
storing a subset of microcode, the subset corresponding to a first plurality of micro-operations of the microcode in a first storage device, wherein the subset remains stored in the first storage device and accessible to execution logic during execution of a plurality of instructions, and wherein a second storage device, on a different integrated circuit chip than the first storage device, is to store a complementary subset of the microcode; and
determining the first plurality of micro-operations to be stored in the first storage device based at least in part on an expected frequency of access to the subset of the microcode.

9. The method of claim 8, further comprising determining the subset of the microcode that is to be stored in the first storage device based on one or more past accesses to the microcode.

10. The method of claim 8, wherein the subset of the microcode includes a reset microcode sequence in the first storage device.

11. The method of claim 8, wherein the first storage device comprises a read only memory (ROM) to store the subset of the microcode.

12. The method of claim 8, further comprising executing a first instruction including translating the first instruction through use of the subset of the microcode.

13. A system comprising:
a first integrated circuit chip including:
   a first storage to store a subset of microcode, the subset corresponding to a portion of the microcode, wherein the subset is to remain stored in the first storage device and accessible during execution of a plurality of instructions;
   first logic to determine whether a first micro-operation of the microcode is to be included in the subset based at least in part on an expected frequency of access to the first micro-operation; and
a second integrated circuit chip including a second storage, wherein the second storage is to store a complementary subset of the microcode.

14. The system of claim 13, wherein at least one processor core, the first storage, and the first logic are on a same integrated circuit chip.

15. The system of claim 13, wherein the first storage comprises a first portion of an instruction cache, wherein the first portion is restricted to storage of the subset of the microcode and wherein a second portion of the instruction cache stores at least one of the plurality of instructions.

16. The processor of claim 1, wherein the first storage device comprises a read only memory (ROM) to store the subset of the microcode.

17. The processor of claim 1, further comprising the execution logic to execute the plurality of instructions, wherein execution of a first instruction of the plurality of instructions includes translation of the first instruction by the execution logic through use of the subset of the microcode without use of the complementary subset.

18. The processor of claim 17, wherein execution of a second instruction includes translation of the second instruction through the use of:
   the subset of the microcode; and
   at least one micro-operation of the complement of the subset.

19. The system of claim 13, wherein the first storage comprises a read only memory (ROM) to store the subset of the microcode.

20. The system of claim 13, wherein each micro-operation of the subset of the microcode has a corresponding frequency of past access for execution of instructions that is larger than a corresponding frequency of past access for execution of instructions of each micro-operation of the complementary subset of the microcode.

\* \* \* \* \*